Sept. 26, 1961    W. H. COOKE ET AL    3,001,902
LIGNOCELLULOSIC TILE AND METHOD FOR ITS MANUFACTURE
Filed June 23, 1958

William H. Cooke
Ronald G. Frashour
INVENTORS

BY *Eugene R. Farley*

Atty.

3,001,902
LIGNOCELLULOSIC TILE AND METHOD FOR ITS MANUFACTURE

William H. Cooke and Ronald G. Frashour, Roseburg, Oreg., assignors to Pacific Plywood Co., Dillard, Oreg., a corporation of Oregon
Filed June 23, 1958, Ser. No. 743,786
13 Claims. (Cl. 154—45.9)

This invention relates to a tile product made from lignocellulosic materials and applicable as a durable covering for floors, walls, and other surfaces.

It is the general object of the present invention to provide a tile product made from inexpensive lignocellulose materials, which is hard and durable so that its surface life is protracted, which is flexible so that it may be applied to uneven surfaces, and which is dimensionally stable so that it does not warp or deform with changes in atmospheric humidity and temperature. It is another object of this invention to provide a method for making a tile product having the aforementioned characteristics.

The manner in which the foregoing and other objects of this invention are accomplished will be apparent from the accompanying specification and claims considered together with the drawings wherein:

The tile of our invention comprises a flat, tile-shaped sheet 10, composed of consolidated lignocellulosic particles adhesively bonded to each other. For durability, the sheet has a specific gravity of from 0.6 to 1.25, preferably from 0.75 to 0.85.

A plurality of spaced grooves 12 arranged in a crisscross pattern are formed in the back side of the tile. Since the grain direction of the component particles of the tile is non-uniform, it is necessary that this pattern be arranged in both directions, with the grooves preferably running at right angles to each other. The grooves need not be parallel to the sides, but may be at an angle thereto, for example, at an angle of 45° thereto.

Figure 2:
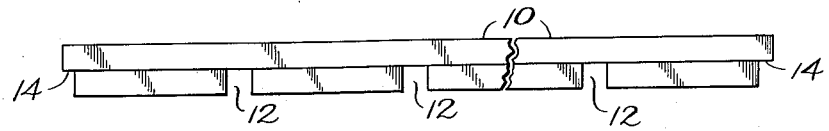
FIG. 2 is a view in end elevation of the herein described tile.

The grooves serve the dual functions of making the tile dimensionally stable, so that it does not warp in use, and of making it flexible, so that it may be laid over uneven surfaces with little difficulty. For these purposes it is necessary that the grooves be rather closely spaced, i.e. not more than one inch apart in both directions. Also, they must extend inwardly to substantially the mid point of the tile, as is indicated in FIG. 2.

Peripheral grooves 14 may be formed along the back edges of the tile. These grooves are of the same depth as grooves 12, but of only about one-half the width of the same. Their function is two-fold. First they provide an area for excess mastic to flow during application, avoiding mastic squeeze out from between the tiles to the surface. Secondly, in the event that foreign matter such as dirt, or sawdust comes between the edges of adjacent tiles during application, the groove eliminates the possibility of misaligning or improperly placing the tile.

Figure 1:
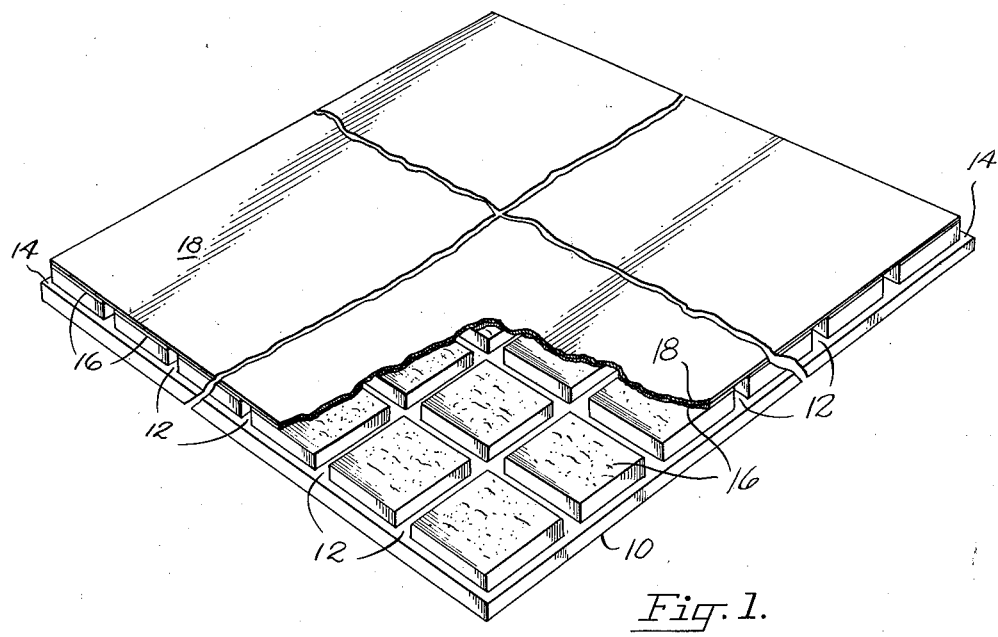
FIG. 1 is a perspective view of the herein described tile.
Figure 3:
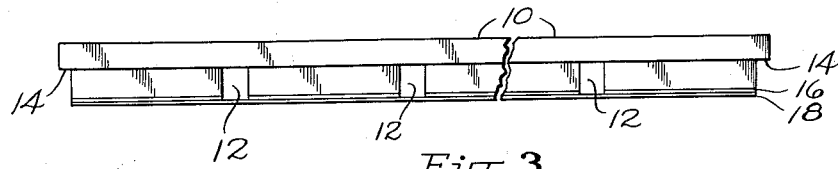
FIG. 3 is a view in end elevation of the herein described tile overlaid with a layer of adhesive and a strippable cover sheet.

Means also may be applied to the tile for facilitating its application to a surface (FIG. 3). Thus it may be precoated at the factory with a layer 16 of suitable adhesive which then is overlaid with a strippable sheet 18. This may be removed prior to application of the tile. In the alternative, the back face of the tile may be coated with one of two required contact adhesives at the factory. The second of the required adhesives then may be brushed on the floor at the point of application and the tile laid directly thereon.

The above tile may be manufactured by a method which utilizes as a raw material any of the commercially available lignocellulose materials such as wood, bagasse, or annual plant materials. The lignocellulose is reduced to small pieces, mixed with adhesive, and formed into mats which are pressed to form products conventionally classed as particle board, flake board, splinter board, chip board, hardboard, etc. These products are formed by hot pressing the lignocellulosic mats to the required specific gravity of not less than 500 pounds per square inch and temperatures of between 300 and 400° F. until the desired density has been achieved.

The pattern of grooves in the back side of the product may be formed by molding it therein during the pressing operation, using platens of the desired configuration. Preferably, however, it is cut or machined in the consolidated panels to substantially the midpoint thereof, using saws or other suitable scoring tools. The grooved panels then may be subdivided into tiles of the desired dimensions. If desired, the back side of the tiles may be coated with adhesive over which a strippable sheet of protective material is placed in the manner described above.

As a typical example of a tile which may be prepared by the presently described method, there may be provided a hardboard, tile-shaped product from $3/16$ to one inch, preferably $1/4-1/2$ inch thick and from 6–48 inches, preferably about 9 inches square. The tile may have a specific gravity of from 0.6–1.25, preferably from 0.75–0.85. The pattern of grooves may be from $1/2$ inch to 1 inch, preferably $3/4$ inch apart.

Specifically, a tile produced by the present method may comprise a particle board tile 9 inches square, $1/4$ inch thick, and having a specific gravity of 0.8. On its back side it may have grooves substantially $1/16$ inch wide, $1/8$ inch deep, and $1/2$ inch apart.

Such a tile product has numerous advantages. First of all, grooving or scoring the back side relieves internal stresses which are inherent in hot pressed lignocellulose composition panels. It also breaks up compression and tension stresses resulting from pick up or loss of moisture from the back side, which differs in rate from pick up and loss from the finished face of the tile. Relief of these stresses results in a stable tile which has a markedly reduced tendency to warp with changing humidity conditions.

Grooving also makes the tile flexible. This reduces the magnitude of the stresses developed if the product tends to warp. In the case of a rigid floor tile, any tendency to warp could eventually pull the tile free of the mastic with which it is applied to the floor. However, in the case of a flexible tile, the mastic has sufficient strength to resist any warping tendency.

Flexibility of the tile resulting from grooving has another major advantage. The surface to which the tile is applied, alothough essentially flat, always has imperfections which make it very desirable that the tile be flexible enough to conform to the surface. The presently described tile product has tthe requisite degree of flexibility to attain this objective.

The grooves in the back of the tile also provide a place for excess mastic to flow so that each tile may be pressed down flush with tile that are already in place. This is particularly helpful when laying tile on rough or old surfaces, where excess mastic is applied to overcome uneven places in the surface.

Still further, the resiliency and accoustical characteristics of a tile used on the floor are improved by back grooving. Shipping weights are reduced by as much as 10%, depending on the width, depth and spacing of the grooves. The tile may be cut for fitting simply by scoring in the grooves with a sharp linoleum knife and breaking over a straight edge. For more accurate cutting and fitting the tile may be sawed easily with a hand or table saw. Also, the dead air spaces in the grooves reduce heat loss to the subfloor.

Hence it is apparent that by the present invention we have provided a novel tile product and method for making the same, which product has many and unique advantages and which is widely applicable to a diversity of end uses.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A flexible, dimensionally stable lignocellulosic tile comprising a flat tile-shaped sheet of consolidated lignocellulosic particles adhesively bonded to each other, the sheet having in its back side a criss-cross pattern of grooves defining a plurality of spaced back surfaces adapted to be secured adhesively to a support, the tile being characterized by being substantially rigid throughout the areas of the spaced back surfaces and flexible in the areas of the grooves.

2. The cellulosic tile of claim 1 wherein the lignocellulosic particles comprise wood particles.

3. The cellulosic tile of claim 1 wherein the lignocellulosic particles comprise bagasse particles.

4. The lignocellulosic tile of claim 1 wherein the grooves are not over about one inch apart.

5. The tile of claim 1 wherein the sheet has a specific gravity of from 0.75 to 0.85.

6. The lignocellulosic tile of claim 1 including a layer of adhesive on the spaced back surfaces of the tile and overlying the adhesive a strippable protective layer for preventing premature bonding of the adhesive to an adjacent surface.

7. The tile of claim 1 wherein the sheet has a specific gravity of from 0.6 to 1.25.

8. The tile of claim 1 wherein the grooves forming the criss-cross pattern have a width of at least about $\frac{1}{16}$ inch.

9. The lignocellulosic tile of claim 1 wherein the sheet is provided in its back side with a peripheral groove defining an outer peripheral overhang, the peripheral groove providing for the accumulation of particles and of adhesive squeezed out from under the tile during application and the peripheral overhang serving by abutment against the overhang of adjacent tiles to confine such accumulation against egress to the outer surface of the tiles.

10. The lignocellulosic tile of claim 9 wherein the peripheral groove is substantially the same depth and about one half the width of the grooves forming the criss cross pattern.

11. The method of making a flexible dimensionally stable lignocellulosic tile which comprises consolidating a mat comprising a mixture of lignocellulosic particles and adhesive to a specific gravity of from 0.6 to 1.25, and forming the resulting consolidated product into flat tile-shaped sheets having in their back sides a criss-cross pattern of grooves defining a plurality of spaced back surfaces adapted to be secured adhesively to a support, the tile being characterized by being substantially rigid throughout the areas of the spaced back surfaces and flexible in the areas of the grooves.

12. The method of claim 11 including the step of applying a layer of adhesive to the spaced back surfaces of each tile, and superimposing thereover a strippable sheet of material for preventing the premature adhesion of the tile to an adjacent surface.

13. A tile adapted to be adhesively secured to a backing support and having in its back side a peripheral groove defining an outer peripheral overhang, the peripheral groove providing for the accumulation of particles and of adhesive squeezed out from under the tile during application and the peripheral overhang serving by abutment against the overhang of adjacent tiles to confine such accumulation against egress to the outer surface of the tiles.

References Cited in the file of this patent
UNITED STATES PATENTS

| Number | Name | Date |
|---|---|---|
| 1,706,661 | Greenebaum | Mar. 26, 1929 |
| 1,943,663 | Ericson | Jan. 16, 1934 |
| 2,247,205 | Schorger | June 24, 1941 |
| 2,248,233 | Heritage | July 8, 1941 |
| 2,637,995 | Mann | May 12, 1953 |
| 2,680,319 | Dratler | June 8, 1954 |
| 2,719,808 | Elmendorf | Oct. 4, 1955 |
| 2,760,881 | Toulmin | Aug. 28, 1956 |

FOREIGN PATENTS

| 697,791 | Great Britain | Sept. 30, 1953 |